United States Patent [19]

Winkler

[11] 4,085,483
[45] Apr. 25, 1978

[54] APPARATUS FOR SHIRRING TUBULAR FILMS

[75] Inventor: Bruno Winkler, Weinheim-Oberflockenbach, Germany

[73] Assignee: Naturin-Werk Becker & Co., Weinheim, Germany

[21] Appl. No.: 543,073

[22] Filed: Jan. 22, 1975

[30] Foreign Application Priority Data

Jan. 25, 1974 Germany .............................. 2403470

[51] Int. Cl.² .............................................. A22C 13/02
[52] U.S. Cl. .......................................... 17/42; 426/138
[58] Field of Search ............................... 17/42, 1 F, 49; 426/420, 135, 138, 140, 105; 138/118.1

[56] References Cited

U.S. PATENT DOCUMENTS

| 2,630,598 | 3/1953 | Grey ........................................ 17/1 F |
| 2,981,971 | 5/1961 | Zubrychi ................................. 17/1 F |
| 2,984,574 | 5/1961 | Matecki .................................... 17/42 |
| 3,594,857 | 7/1971 | Michl ......................................... 17/42 |
| 3,704,483 | 12/1972 | Urbutis et al. ........................... 17/49 |
| 3,779,284 | 12/1973 | Tums ......................................... 17/42 |
| 3,907,003 | 9/1975 | Regner et al. ........................... 17/42 |

Primary Examiner—Jay N. Eskovitz
Attorney, Agent, or Firm—Brumbaugh, Graves, Donohue & Raymond

[57] ABSTRACT

In apparatus for shirring tubular films, the shirring rollers rotate not only about their own axes but also about the longitudinal axis of the shirring mandrel. This gives increased and more uniform compression.

15 Claims, 6 Drawing Figures

APPARATUS FOR SHIRRING TUBULAR FILMS

BACKGROUND OF THE INVENTION

This invention relates to a device and a process for shirring tubular films.

Tubular films of collagen or cellulose are used extensively as sausage casings. Thin sausages, such as frankfurters or (German) frying sausages are at the present time mostly filled by machine, by closing a sufficiently long piece of tubular film at one end and pushing its open end over the filling nozzle of the filling machine. For these purposes, the manufacturers market the sausage casings in a convenient form for the user, namely as so-called "caterpillars", which consist of a long piece of tube which has been shirred so that its length is 30 to 40 cm. Such a caterpillar is taken out of its container by the user, closed at one end and held with the other, open, end over the filling nozzle of the filling machine. The filling pressure opens up the shirring and brings the full length of the tube into use.

Usually, the tubular film is shirred by pressing the tube over a fixed shirring mandrel against a solid stop, by the action of toothed shirring rollers engaging on the periphery of the tube. In this process, it is desirable to have the closest possible density of shirring so as to include as much tube as possible in a caterpillar of a given length. However, the production of high shirring densities requires complicated shirring rollers. The individual shirring teeth of a roller have to have different shapes, which requires very expensive casting moulds and adds to the cost of the manufacturing process.

In principle, therefore a shirring device of which the shirring rollers have teeth of identical shape would be highly desirable. However, when using shirring rollers with identical teeth, the quality of the shirring depends very greatly on the ratio of the gut diameter to the diameter of the shirring mandrel. If the gut diameter is near the upper limit within the tolerances resulting from the production process, shirring with shirring rollers of identical teeth gives oval gut "caterpillars" which can be filled only with difficulty on modern filling machines.

To produce greater shirring density a further previous proposal comprises allowing the shirring mandrel or the shirring head to swivel about the longitudinal axis of the shirring mandrel. Whilst this achieves some degree of mutual displacement and anchoring of the shirred folds, the conventional shirred form, in which the individual shirred folds are not displaced relative to one another, is produced at the points of reversal of the swivelling motion. At these points, the stiffness of the caterpillar is less than at the other points.

It is an object of the present invention to provide a shirring device which permits the use of shirring rollers of simple shape and with identical teeth, whilst nevertheless achieving very uniform shirring of good quality and at a high shirring ratio, and to provide a process for shirring tubular films on such a device.

SUMMARY OF THE INVENTION

The present invention provides apparatus for shirring a tubular film, which comprises a shirring mandrel and a plurality of shirring rollers, said rollers being so arranged that in addition to being rotatable about their own axes to produce a shirring effect they can also rotate about the longitudinal axis of the shirring mandrel.

In general, there will be a single pair of co-operating shirring rollers. The shirring mandrel should normally be stationary.

The tube may be made of any desired material, for example, collagen or cellulose.

Preferably, the rotary movement of the shirring rollers about the longitudinal axis of the shirring mandrel is effected by mounting the shirring rollers on a plate which revolves about the longitudinal axis of the gut. The plate, which is preferably circular, has a central bore to accommodate the shirring mandrel and the tube.

The rotating plate is advantageously mounted centrally at one end of a hollow shaft which is driven in any desired manner, for example by means of a variable speed motor via a belt drive, a gearwheel drive or a toothed belt drive.

The shirring rollers of the device according to the invention may have uniform teeth, which makes their manufacture much simpler and cheaper.

Advantageously, the actual drive of the shirring rollers is independent of the drive for rotating the shirring rollers about the longitudinal axis of the shirring mandrel.

Preferably, the shirring rollers are driven via corresponding force-transmission members by a gearwheel mounted on the hollow shaft and driven independently thereof. The gearwheel preferably has internal teeth.

In one form of apparatus employing a drive gearwheel, each shirring roller is rigidly coupled thereto. In this case, each shirring roller has an associated gearwheel, mounted at the end of a drive shaft, which engages with the gearwheel mounted on the hollow shaft. The driving force is transmitted through the two shafts which pass through bores in the rotatable plate, and thence by way of direction-changing transmission members, preferably mitre gear assemblies.

In another form of apparatus, only one, and not both, of a pair of shirring rollers is rigidly coupled to the drive gearwheel. The drive shaft which passes through the rotatable plate then carries, adjacent the gearwheel and rigidly coupled thereto, a force transmission member, preferably a toothed belt wheel, which is coupled via a toothed belt to a corresponding force transmission member on the drive shaft of the other shirring roller. Optionally, the toothed belt is tensioned by a tensioning roller and guided by a guide roller.

The transmission member by means of which the direction of the force for driving the shirring rollers is varied and which is, preferably a mitre gear, is advantageously itself mounted on a rotatable plate as hereinbefore specified.

The invention also provides a process for the manufacture of shirred tubular films, wherein an unshirred tube is passed over a shirring mandrel and pressed against a fixed stop and is at the same time subjected to a shirring action at its periphery by forces which act substantially in the direction of travel of the tube, wherein the forces which engage on the periphery of the tube are caused to rotate about the longitudinal axis of the shirring mandrel.

Preferably, the shirring forces are produced by rotation of toothed shirring rollers.

After shirring, the tube is conveniently cut and stripped off the mandrel.

The invention further provides a tube which has been shirred according to the invention. Preferably, the shirred tube has two zones of increased compression which follow a spiral path about the axis of the tube.

Advantageously the zones of increased compression each follow the same direction of rotation about the longitudinal axis of the tube.

BRIEF DESCRIPTION OF THE DRAWINGS

A shirring device according to the invention and suitable for carrying out the method of the invention will now be described, by way of example, with reference to the accompanying drawings, in which.

DESCRIPTION OF THE PREFERRED EMBODIMENT

Figure 1:
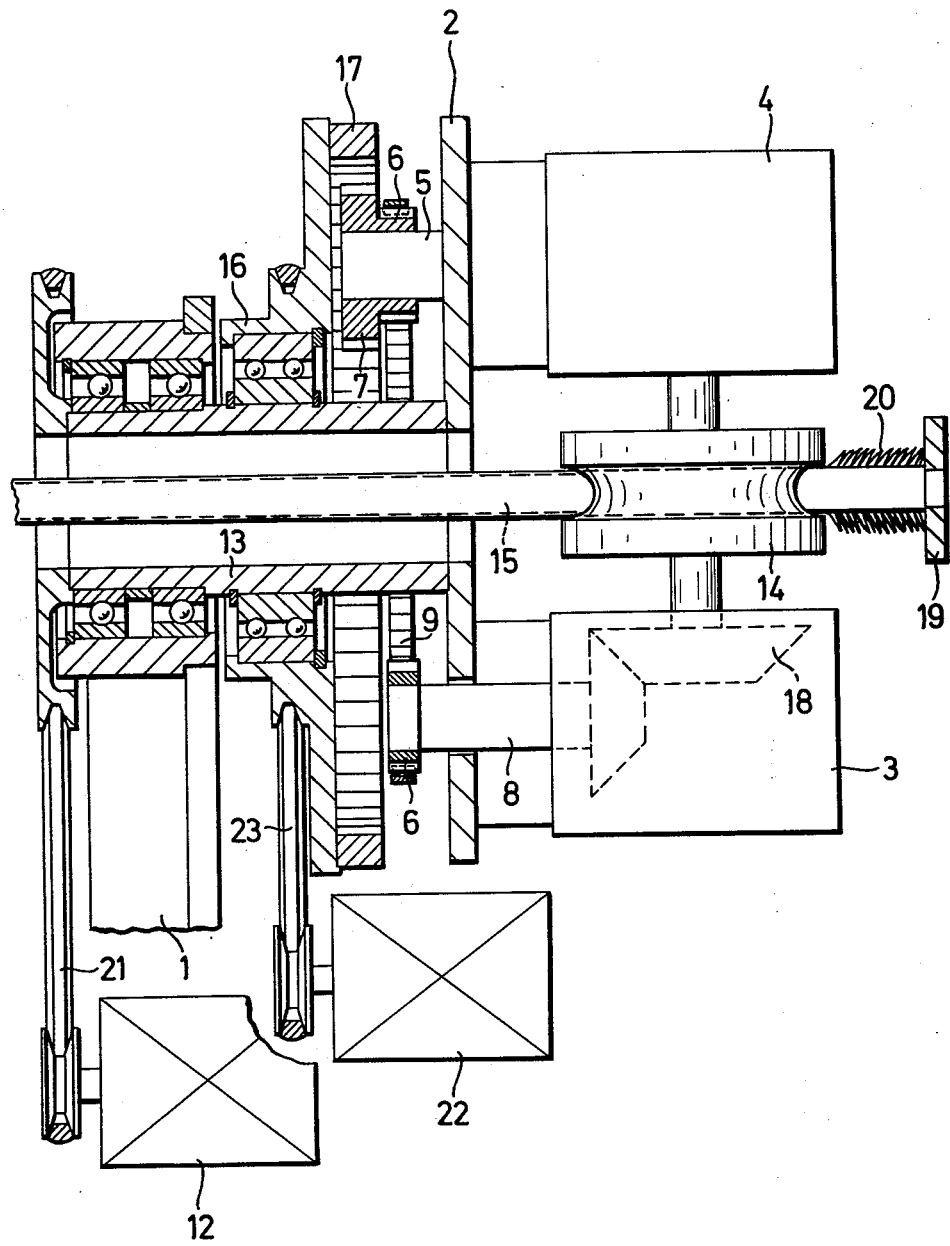
FIG. 1 shows a longitudinal section of the device.

Referring to FIG. 1, a bearing block 1 supports a hollow shaft 13 on which is mounted a gear disc 2. A shirring mandrel 15 extends through the shaft 13. Two mitre gear assemblies 3 and 4 are mounted on the gear disc. A drive shaft 5 serves one of a pair of shirring rollers 14 and is provided with a toothed belt wheel 6 and a gearwheel 7. The drive shaft 8 for the second shirring roller is provided only with a toothed belt wheel 6. The toothed belt wheels are connected by a toothed belt 9. Normal rotation of the shirring rollers 14 is imparted thereto by bevelled gears 18 in the gear assemblies 3, 4.

If the hollow shaft 13 and the gear disc 2 with the mitre gears 3 and 4 mounted thereon are brought into motion by means of a variable-speed drive motor 12, which acts via a Vee-belt 21, the shirring rollers 14 rotate about the shirring mandrel 15.

The hollow shaft 13 supports a further drive member 16 having an internally-toothed gearwheel 17 mounted thereon. A variable-speed motor 22 rotates the assembly 16, 17 via Vee-belts 23. Rotation of the gearwheel 17 in turn drives the gearwheel 7. The gearwheel 7 and the toothed belt wheel 6 are rigidly coupled, so that the toothed belt 9 then drives both drive shafts 5 and 8, which cause the shirring rollers 14 to rotate via the bevelled wheels 18 and push the gut along the shirring mandrel 15 to form a shirred tube 20 against a stop member 19.

In a modified form of apparatus not shown in the drawing, the second shirring roller is also driven by a gearwheel corresponding to the gearwheel 7 and mounted on the drive shaft 8. The two toothed belt wheels 6 and the belt drive 9 are then omitted.

The speed of rotation of the shirring rollers 14 and the speed of rotation of the entire shirring head about the mandrel may be adjusted within wide limits by means of the variable-speed motors 12 and 22. Stopping the motor 12 stops the rotation of the shirring head, thereby giving a shirring device operating according to the previous proposals, in which the shirring rollers do not execute any movements other than rotation about their own axis.

Figure 2:
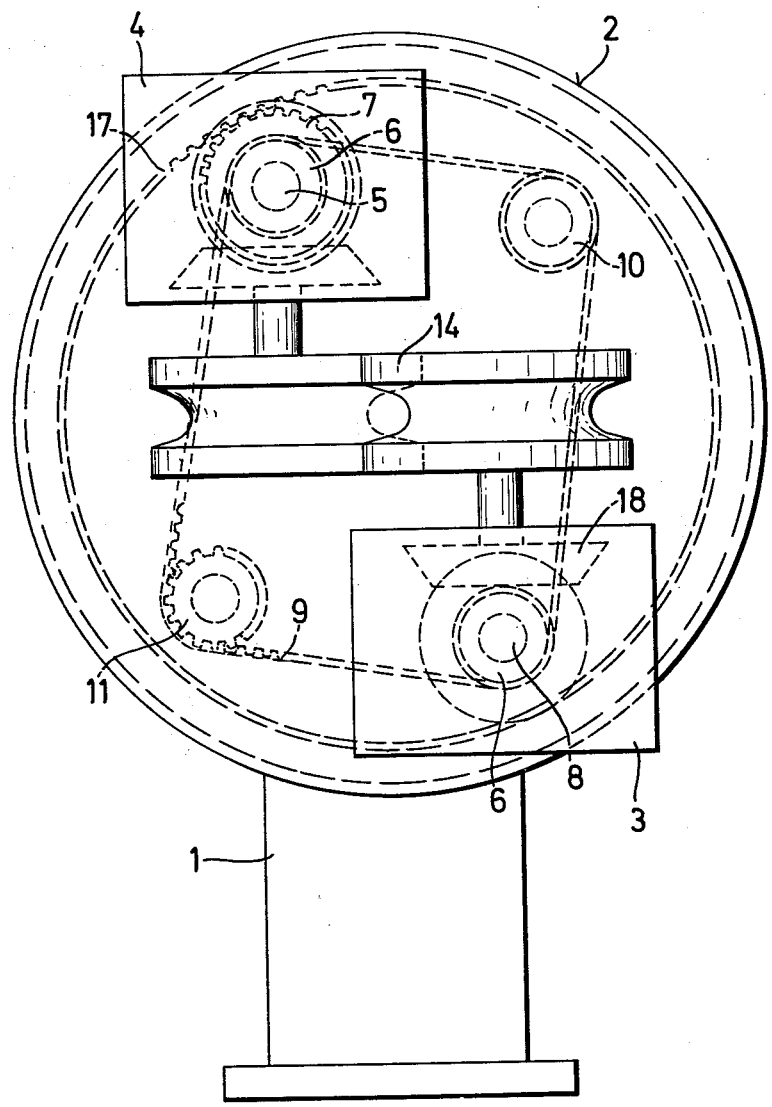
FIG. 2 is a side elevation of the device as seen from the right of FIG. 1.

Referring to FIG. 2, the toothed belt 9 is guided over a guide roller 10 and kept taut with a tension roller 11.

Figure 3:
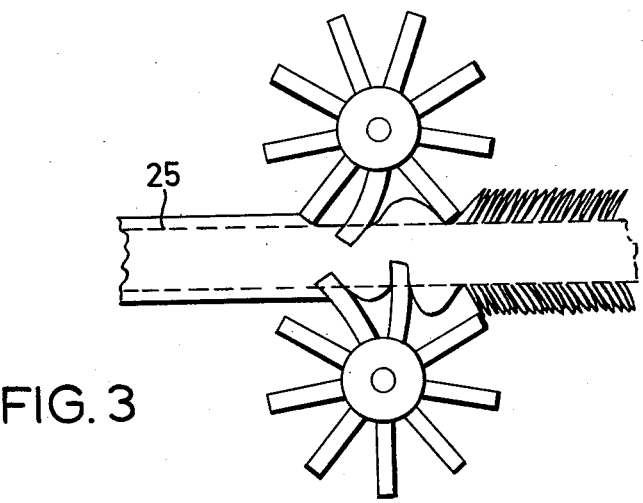
FIG. 3 shows a shirring device of the conventional type.
Figure 4:
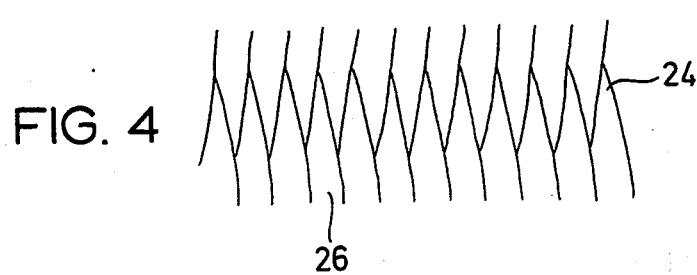
FIG. 4 shows the pattern of shirred folds of a caterpillar produced with the shirring device according to FIG. 3.
Figure 5:
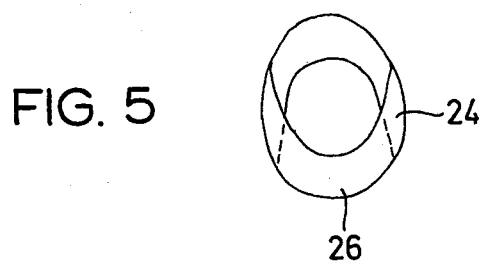
FIG. 5 shows a caterpillar of oval cross-section, obtained by shirring by means of fixed shirring rollers according to FIG. 3, a tube of which the diameter is near the upper limit of the tolerances resulting from the production process.
Figure 6:
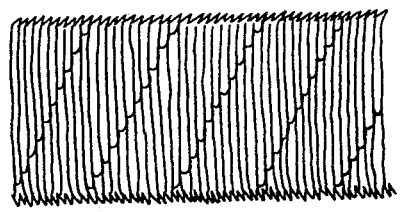
FIG. 6 shows the pattern of shirred folds of a caterpillar produced with the shirring device according to FIG. 1.

Certain principles may be elucidated by reference to FIGS. 3 to 5.

FIG. 3 shows that in the zone of engagement 25 of the teeth of the two fixed shirring rollers used hitherto a greatly compressed region is produced as shown at 24 in FIG. 4. 26 shown a region of only slight compression.

In the diagrammatic cross-section shown in FIG. 5, 24 is the creasing zone of high degree of compression. In contrast, the degree of compression of the caterpillar is very slight in position 26.

The most advantageous form of caterpillar can easily be discovered by starting up the motor 12 and gradually increasing the speed of rotation of the shirring head. The crease zones 24 follow a spiral path about the axis of the caterpillar. A low speed of rotation of the shirring head produces a high pitch and a high speed of rotation results in a low pitch. In this way, the high degree of local compression of the creasing zones 24 can be distributed over the entire periphery of the caterpillar. As a result, if the speed of rotation of the shirring head is sufficiently high, a completely circular caterpillar is obtained. Moreover, owing to the spiral displacement of the creasing zones 24, a uniform degree of compression over the entire periphery can be achieved. In addition, there is a mutual anchoring of the shirred folds, resulting in stiffening of the shirred gut caterpillar.

The following example illustrates the invention:

A gut of 21 mm diameter and 0.025 mm wall thickness is shirred on a shirring mandrel of 13 mm diameter. With a static shirring head it is only possible to shirr 10 m of gut for a caterpillar length of 18.5 cm. By contrast, if the shirring head is rotated so as to execute one revolution per 5 cm of non-shirred gut length, it proves possible to shirr 14 m of gut for a caterpillar length of 18.5 cm. In each case, the compression of the shirred folds is the same. The attainable shirring ratio is, accordingly, 10 m/18.5 cm = 54 in the first case and 14 m/18.5 cm = 76 in the second.

In this example, therefore, the length of the gut compressed into a given length of shirred tube is increased by 40% by rotation of the shirring head in accordance with the invention.

I claim:

1. Apparatus for shirring a tubular film, comprising:
  a shirring mandrel having an axis;
  a plurality of shirring rollers, disposed about said mandrel, each of said rollers being rotatable on a roller axis perpendicular to said mandrel axis and having a plurality of substantially identical teeth, said rollers being arranged to continuously rotate in a selected direction about said mandrel axis;
  and means for rotating said rollers on said roller axes to cause said teeth to apply shirring forces, parallel to said mandrel axis, to a tubular film on said mandrel and for continuously rotating said rollers about mandrel axis to cause the points at which said shirring forces are applied to continuously rotate about said mandrel axis.

2. Apparatus according to claim 1 wherein said shirring rollers are mounted on a plate which is rotatable about said mandrel axis and has a central bore to accomodate said mandrel.

3. Apparatus according to claim 2, wherein the plate carrying the shirring rollers is coupled at its centre to a hollow drive shaft surrounding the shirring mandrel.

4. Apparatus according to claim 3, wherein said plate is substantially circular.

5. Apparatus according to claim 1 wherein said means for rotating said rollers comprises first means for rotating said rollers about said roller axes and second means for independently rotating said rollers about said mandrel axis.

6. Apparatus according to claim 5 wherein said means for rotating said rollers about said roller axes includes drive means, a gear wheel connected to said drive means, and transmission means connecting said shirring rollers to said gear wheel.

7. Apparatus according to claim 6 wherein said rollers are mounted on a plate, said plate being mounted to a hollow drive shaft surrounding said mandrel and rotatable about said mandrel and wherein said gear wheel is rotatably mounted on said shaft.

8. Apparatus according to claim 25 wherein said first and second rotating means are independently variable in speed.

9. Apparatus according to claim 7, wherein the gearwheel has internal teeth.

10. Apparatus according to any one of claim 9, wherein each shirring roller is rigidly coupled to the drive gearwheel.

11. Apparatus according to claim 9, which comprises a pair of shirring rollers, one of which is rigidly coupled to the gearwheel and the other of which is coupled to the said gearwheel by way of a belt drive.

12. Apparatus according to claim 1, wherein each shirring roller is coupled to an associated drive shaft by way of a mitre gear assembly.

13. Apparatus according to claim 1, which comprises a single pair of co-operating shirring rollers.

14. Apparatus according to claim 1, wherein the shirring mandrel is stationary.

15. Apparatus for shirring a tubular film comprising:
a shirring mandrel having an axis;
a first member, journaled for rotation about said mandrel axis and having a central bore accommodating said mandrel;
a plurality of shirring rollers, mounted to said first member, tangent to the axis of said mandrel, each of said rollers being rotatable on a roller axis perpendicular to said mandrel axis and having a plurality of substantially identical teeth;
a second member, independently journaled for rotation about said mandrel axis, and having a central bore accommodating said mandrel;
transmission means, responsive to the relative rotation of said first and second members for rotating said rollers about said roller axes;
and means for rotating said first member with respect to said mandrel and for rotating said second member with respect to said first member.

* * * * *

UNITED STATES PATENT OFFICE
CERTIFICATE OF CORRECTION

Patent No. 4,085,483   Dated April 25, 1978

Inventor(s) Dr.-Ing. Gerald Klopsch

It is certified that error appears in the above-identified patent and that said Letters Patent are hereby corrected as shown below:

Col. 5, line 21, "claim 25" should read --claim 5--;

Col. 5, line 26, "any one of claim 9" should read --claim 9--.

Signed and Sealed this

Sixth Day of March 1979

[SEAL]

Attest:

RUTH C. MASON
Attesting Officer

DONALD W. BANNER
Commissioner of Patents and Trademarks